United States Patent [19]

Su

[11] Patent Number: 5,255,343
[45] Date of Patent: Oct. 19, 1993

[54] METHOD FOR DETECTING AND MASKING BAD FRAMES IN CODED SPEECH SIGNALS

[75] Inventor: Huan-yu Su, St-Bruno, Canada

[73] Assignee: Northern Telecom Limited, Montreal, Canada

[21] Appl. No.: 904,638

[22] Filed: Jun. 26, 1992

[51] Int. Cl.⁵ .............................................. G10L 5/00
[52] U.S. Cl. ................................. 395/2.51; 395/2.45; 395/2.4; 381/43
[58] Field of Search ................... 381/36, 43, 31, 38, 381/51, 46; 395/2; 371/3, 43, 5.5

[56] References Cited

U.S. PATENT DOCUMENTS

| | | | |
|---|---|---|---|
| 4,418,409 | 11/1983 | Queen | 381/34 |
| 4,677,671 | 6/1987 | Galand et al. | 381/31 |
| 4,747,104 | 5/1987 | Piret | 371/39 |
| 4,763,328 | 8/1988 | Shimoda et al. | 371/3 |
| 4,802,171 | 1/1989 | Rasky | 381/46 |
| 4,956,865 | 9/1990 | Lennig et al. | 381/43 |
| 5,048,088 | 9/1991 | Taguchi | 381/38 |
| 5,054,025 | 10/1991 | Galand et al. | 381/31 |
| 5,073,940 | 12/1991 | Zinser et al. | 381/38 |
| 5,091,944 | 2/1992 | Takahashi | 381/36 |
| 5,091,945 | 2/1992 | Kleijn | 381/36 |
| 5,097,507 | 3/1992 | Zinser et al. | 381/46 |
| 5,113,400 | 5/1992 | Gould et al. | 371/43 |
| 5,138,661 | 8/1992 | Zinser et al. | 381/51 |
| 5,142,584 | 8/1992 | Ozawa | 381/36 |
| 5,148,431 | 9/1992 | Hayashi | 371/5.5 |
| 5,148,487 | 9/1992 | Nagai et al. | 381/46 |
| 5,182,753 | 1/1993 | Dahlin et al. | 381/31 |

Primary Examiner—Michael R. Fleming
Assistant Examiner—Tarig R. Hafiz
Attorney, Agent, or Firm—Jean-Pierre Fortin

[57] ABSTRACT

The process for detection and masking of bad frames in a coded speech signal resulting from channel transmission errors has been improved. The coded speech signal has a first group of bits comprising the most perceptually significant bits of the coded speech signal, a second group of bits comprising the second most perceptually significant bits and a third group of bits comprising the least perceptually significant bits. The coded speech signal is de-interleaved to obtain a first series of bits comprising the first and second group and a second series of bits comprising the third group of bits. The first series of bits are convolutionally decoded for recovering the first and second group of bits, with the first group of bits containing error protected bits. A CRC check is performed by sending the recovered bits of the first group to cyclic redundancy decoding means. The first group of bits is forwarded to speech decoder means if the CRC check is successful. The frame energy and LPC parameters are replicated for the first and third group of bits and the frame energy, LPC parameters, lag value and sub-frame gain are replicated for the second group of bits, and subsequently the replicated bits are forwarded to the speech coder means, if the CRC check is not successful.

5 Claims, 6 Drawing Sheets

| Parameter | Number of bits per frame | A group | B group | C group |
|---|---|---|---|---|
| Frame Energy | 5 | 3 | 1 | 1 |
| LPC parameters | 38 | 9 | 4 | 25 |
| Pitch lag | 28 | 0 | 28 | 0 |
| code indices | 56 | 0 | 0 | 56 |
| Subframe gain (GSP0P1) | 32 | 0 | 32 | 0 |
| CRC bits | 7 | 7 | 0 | 0 |

Frame parameters: {LPC parameters, Frame Energy}

Sub-frame parameters: {Pitch lag, code indices, Subframe gain}

FIGURE 1

METHOD FOR DETECTING AND MASKING BAD FRAMES IN CODED SPEECH SIGNALS

FIELD OF THE INVENTION

This invention relates to speech coding and decoding and more particularly, to the recovery of encoded speech information corrupted by errors due to channel fading.

BACKGROUND OF THE INVENTION

In digital cellular mobile systems, speech communication is realized by transmitting and receiving the encoded speech information bit stream through a radio channel. Because of the possibility of transmission errors in the fading channel, the received data may be totally corrupted. Thus, a channel codec (coder-decoder) is essential to mitigate the effects of transmission errors.

The channel codec must carry out three fundamental functions:
a) error correction up to the capability of the channel coding employed;
b) bad frame detection when the correction fails; and
c) bad frame masking with the aid of the speech decoder to reconstruct the lost frame.

The error correction capability of a channel codec is determined by the error protection techniques used, (such as, convolution coding or Reed-Solomon coding) as well as other processing steps such as interleaving of frames, and feed-back of receiver status (soft channel coding).

In the new Digital Cellular Interim Standard 54 (IS-54), convolution coding and Viterbi decoding were selected as the error protection schemes.

The standard calls for a speech codec operating at 7950 bits/sec and able to produce 159 bits for each speech frame of 20 msec. The channel protection used in the standard is a multi-step channel codec. At the channel coder side, the 159 bits are regrouped into two classes of bits, according to their sensitivity to the regenerated speech quality. There are 77 class 1 bits and 82 class 2 bits. The class 1 bits are more sensitive than the class 2 bits.

A 7 bit CRC (Cyclic Redundancy Checking) is used for the purpose of error detection. These 7 bits are computed over the 12 most perceptually significant bits (this means that one error in these 12 bits will degrade severely the regenerated speech quality). These 7 bits are part of the class 1 bits. Thus, there are in total 84 class 1 bits.

An error protection technique based on convolutional coding is applied on the class 1 bits. This convolutional coding uses a rate $\frac{1}{2}$, 5-bit memory convolutional code. The output bits from the convolution coder are then interleaved with the class 2 bits. Half of these bits are then transmitted at the current time slot and the remainder are transmitted 20 ms later.

The channel decoder operates in the reversed order. That is, the received data is de-interleaved in order to recover the bits corresponding to the current speech frame, and in order to separate these bits into class 2 bits and the bits to be convolutionally decoded. The received bits are then convolutionally decoded to recover the class 1 bits (error correction step) and a CRC check is done of the 12 most perceptually significant bits (error detection step). A bad frame masking technique is employed whenever the CRC check fails.

The problem with this approach is two-fold. First, the bad frame detection (CRC checking) is only based on the 12 most perceptually significant bits and the 7 CRC bits. Note that a single error in these 7 bits can also cause a CRC check failure. Errors which might have occurred in the other 65 class 1 bits are not taken into account. It was determined that even if the CRC check succeeds, there could be more than 45% bit error rate in these 65 bits.

Second, the bad frame masking repeats only the R0 and the LPC bits. The lag bits and the sub frame gain (GSP0) bits are always used as received. But, when CRC checking fails, the BER for these bits is usually very high (the average is around 25%).

In both cases, the use of the Lag bits and the GSP0 bits as received, having more than 10% bit errors, will degrade the regenerated speech quality. When errors occur in the GSP0 bits, the regenerated speech is usually explosion-like, which reduces considerably the intelligibility as well as the perceptual quality of the decoded speech.

Accordingly there is a need for an improved bad frame detection and masking technique which will help in the avoidance of explosion-like speech.

Thus, it is an object of the present invention to provide an improved error detection and bad frame masking technique which provides smoother regenerated speech, improves intelligibility and the perceptual quality of speech.

Another object of the present invention is to provide an improved error detection technique so that errors occurring in the Class 1 bits, other than the most significant bits, can be taken into account.

Another object of the present invention is to provide an improved bad frame masking technique so that erroneous information will not be used by the speech decoder.

Yet another object of the present invention is to provide an improved error detection and bad frame masking technique which can be implemented with the requirements of the digital cellular standard.

SUMMARY OF THE INVENTION

According to a first aspect of the invention, there is provided a method of improving the detection and masking of bad frames in a coded speech signal resulting from channel transmission errors, said coded speech signal having a first group of bits comprising the most perceptually significant bits of said coded speech signal, a second group of bits comprising the second most perceptually significant bits and a third group of bits comprising the least perceptually significant bits, comprising:

de-interleaving said coded speech signal to obtain a first series of bits comprising said first and second group and a second series of bits comprising said third group of bits;

convolutionally decoding said first series of bits for recovering said first and second group of bits, said first group of bits containing error protected bits;

performing a CRC check by sending said recovered bits of said first group to cyclic redundancy decoding means;

forwarding said first group of bits to speech decoder means if said CRC check is successful; and replicating the frame energy and LPC parameters for said first and third group of bits and replicating the frame energy, LPC parameters, lag value and sub-frame gain for said second group of bits, and subsequently forwarding the replicated bits to said speech coder means, if said CRC check is not successful.

BRIEF DESCRIPTION OF THE DRAWINGS

FIG. 1 is a table of the bit assignment according to the IS-54 channel codec requirements;

DESCRIPTION OF THE PREFERRED EMBODIMENT

As is shown in FIG. 1, the speech information bits in digital cellular systems (TIA-IS-54 and GSM) are organised into three groups:

Group A comprises the perceptually most significant bits protected by error detection as well as protection bits. If errors are detected in this group, the decoding is considered unsuccessful and the received information is discarded. In Group A there are 3 frame energy bits, 9 Linear Prediction Coding (LPC) bits and 7 CRC bits for a total of 19 bits.

Group B comprises a larger group of perceptually significant bits covered by error correction only. This part of the received bit stream may include errors even after decoding even though the group A error detection indicates no errors. Group B bits are comprised of 1 frame energy bit, 4 LPC parameter bits, 28 pitch lag bits and 32 sub-frame gain bits for a total of 65 bits.

Group C comprises a group of perceptually less significant bits that are not protected at all. Errors in this group generally only have a minor impact on speech quality. In this group, there is 1 bit allocated to Frame Energy, 25 bits to LPC parameters and 56 bits allocated to code indices.

Figure 2A:
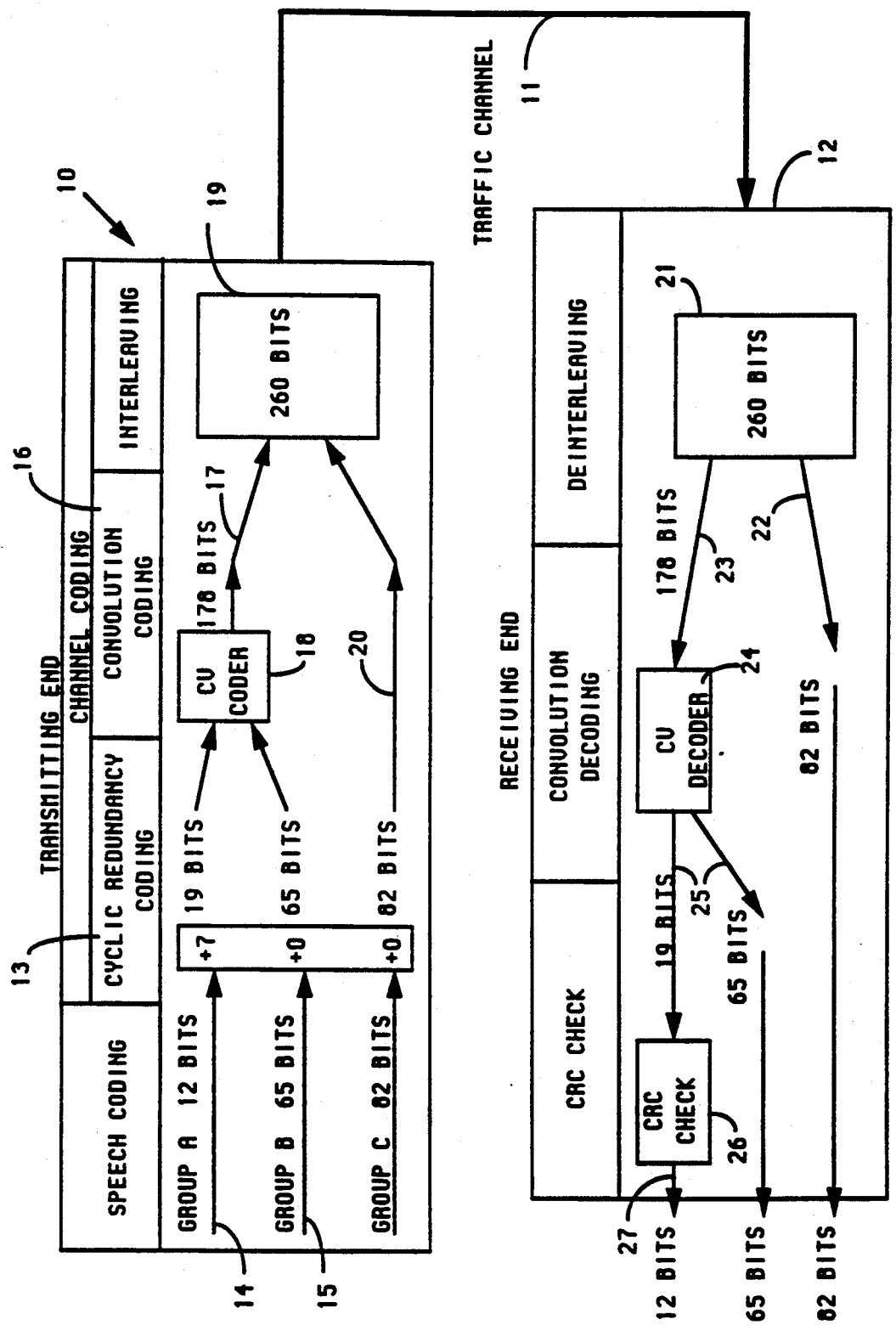
FIG. 2a is a block diagram showing the general speech coding/decoding operation of IS-54.

If we now refer to FIG. 2a, we have shown a functional block diagram showing the general speech coding/decoding operation required in the IS-54 digital cellular standard. The drawing depicts the channel coding steps necessary at the transmitting end 10 before the data is transmitted on a radio traffic channel 11. At the receiving end 12 the data is decoded to recover the original information. Note that since both the base station radio and the mobile unit have a transmitting and a receiving unit, the discussion of the operation of this invention will be general and will not be directed to either the base station or mobile unit specifically.

The North American digital cellular standard requires the use of a speech codec (coder-decoder) operating at 7950 bits/sec. It produces 159 bits for each speech frame of 20 msec.

The channel protection used in the standard is a multi-step channel codec. With reference to FIG. 2a, these steps can be described as follows:

At the channel coder side, the 159 bits are regrouped into two classes of bits, Group A and B forming the first class and Group C forming the second class, according to their sensitivity to the regenerated speech quality. Thus, there are 77 class 1 bits and 82 class 2 bits. The class 1 bits are more sensitive than the class 2 bits.

A 7 bit CRC (Cyclic Redundancy Checking) 13 is used for the purpose of error detection, these 7 bits are computed over the 12 most perceptually significant bits 14, i.e. Group A bits (this means that one error in these 12 bits will severely degrade the regenerated speech quality).

These 7 bits are part of the class 1 bits. Thus, with 12+7 bits in Group A and 65 bits in Group B 15, there is a total of 84 class 1 bits.

An error protection technique 16 is then applied on the class 1 bits. This error protection technique is based on convolutional coding. This convolutional coding uses a rate $\frac{1}{2}$, 5-bit memory convolutional code.

The output bits 17 from the convolutional coder 18 are then interleaved 19 with the class 2 or Group C bits 20. Then, half of these bits are transmitted with the current time slot. The remainder are transmitted 20 ms later.

At the receiving end 12, the channel decoder operates in the reverse order. That is, the received data is first de-interleaved 21 in order to recover the bits corresponding to the current speech frame and in order to separate these bits back into the class 2 bits 22 and the bits 23 which will need to be convolutionally decoded.

The bits 23 are convolutionally decoded 24 to recover the class 1 bits, shown generally at reference numeral 25. This is the error correction step. Then, a CRC check 26, is performed to verify that the 12 most perceptually significant bits, i.e. Group A bits 27 are correct. This is the error detection step.

As will be described below, a bad frame masking technique is used whenever the CRC check fails.

Figure 2B:
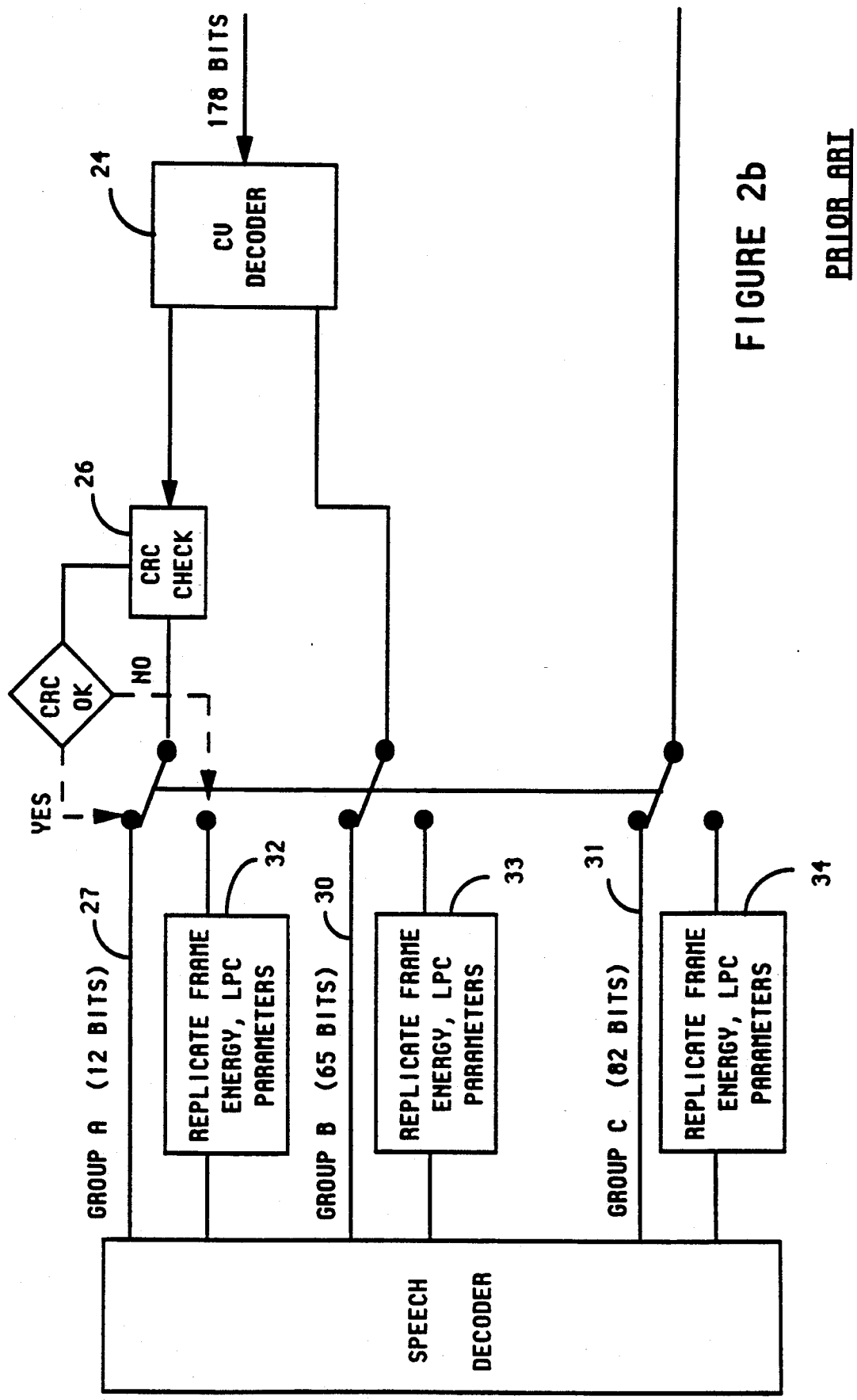
FIG. 2b is a block diagram illustrating the decoding process according to the IS-54 standard.
Figure 2C:
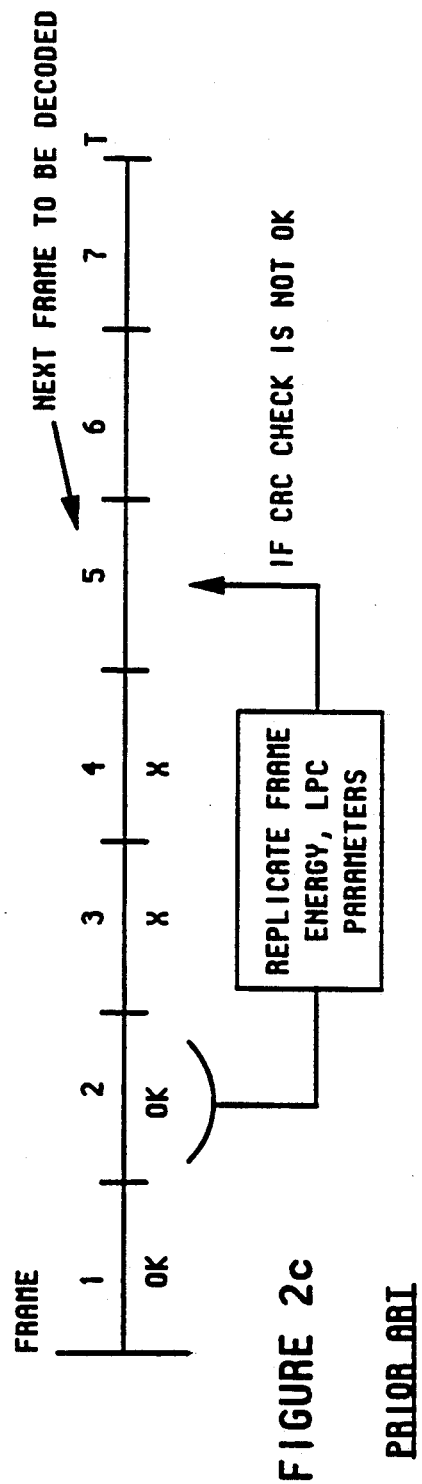
FIG. 2c is an illustration of the bad frame masking process required in the IS-54 standard.

Referring now to FIGS. 2b and 2c, we have shown a functional block diagram illustrating the decoding and bad frame masking processes according to the IS-54 standard.

As indicated above, the bad frame detection is based on the CRC check 26 of the group A bits recovered from the convolution decoder 24. As shown in FIG. 2b, if the CRC check is OK, the recovered class (Group A and B) and class 2 (Group C) bits are used to regenerate the speech. The recovered Group A bits 27, Group B bits 30 and Group C bits 31 are sent to a speech decoder for further processing. However, if the CRC check is not OK, the frame energy and LPC parameters (see FIG. 1) from the previous frame considered to be correctly received are replicated for Groups A, B and C, as shown, respectively, at reference numerals 32, 33 and 34. For example, in the illustration of FIG. 2c, since the CRC check of the Group A bits for Frame 5 was not OK, the frame energy and LPC parameters of the last frame considered to be correctly received, i.e. Frame 2, are replicated for use in Frame 5. The frame energy is reduced depending on the number of consecutive frame errors. However, the pitch lag and subframe gain (see FIG. 1) are always used as received.

In the preferred embodiment of the present invention, an additional error detection technique is used beyond the CRC check. This technique is based on a maximum likelihood (ML) check and is only used if the CRC check is successful. In both the IS-54 and GSM standards, maximum likelihood convolutional decoding (Viterbi decoding) is employed to recover the protected bits in Group A and Group B bits. Statistically, the metric assigned to the final surviving path by Vertibi decoding represents a measure of confidence in the recovered bits. The higher the metric, the lower the estimated bit error rate (BER) for these bits. Thus, based on statistical analysis, a threshold was determined. This threshold is then applied to this metric to determine whether the group B bits are corrupted. Frames are rejected if the CRC check fails or the ML threshold is exceeded. In the IS-54 standard, an appropriate metric is the Hamming distance. The lower the final Hamming distance, the more probable that the final surviving path is correct, the lower the BER for the recovered bits. In the preferred embodiment, a Hamming distance threshold of 19 was computed to be the best compromise. For those frames accepted by CRC check, a BER can be plotted against the ML threshold for group B bits when accepted and when rejected by the ML check. By checking a finite ML threshold (e.g. 19), for a bad channel condition (low vehicle speed, 8 km/h, and low C/I value, 14 db), the BER for accepted frame is reduced from 2% to 0.8%, and the BER for rejected frames is 22%.

In order to improve the regenerated speech quality, the standard bad frame masking technique has been modified so that erroneous parameters are not used to regenerate speech. As is shown in FIG. 3a, three situations can be observed after performing channel decoding.

In the first case, both the CRC check 40 and the ML check 41 indicate no errors. Thus, the Group A, B and C bits are used without modifications.

In the second case, although the CRC check 40 was successful, errors have been detected since the ML check is bad 42. In this instance, the received frame energy and LPC parameter bits of Group A and the Group C bits are used without modification (see FIG. 1), but the lag value and subframe gain parameter bits for each subframe, which make up the Group B bits, are copied 43 from the last subframe of the previous frame accepted by CRC and ML checks.

In the third case, the CRC check 44 is bad since errors have been detected. As in the standard, the frame energy and LPC parameters for Groups A, B and C are replicated from a previous frame. However, the lag value and sub-frame gain bits are replicated 45 as in the second case above.

Figure 3C:
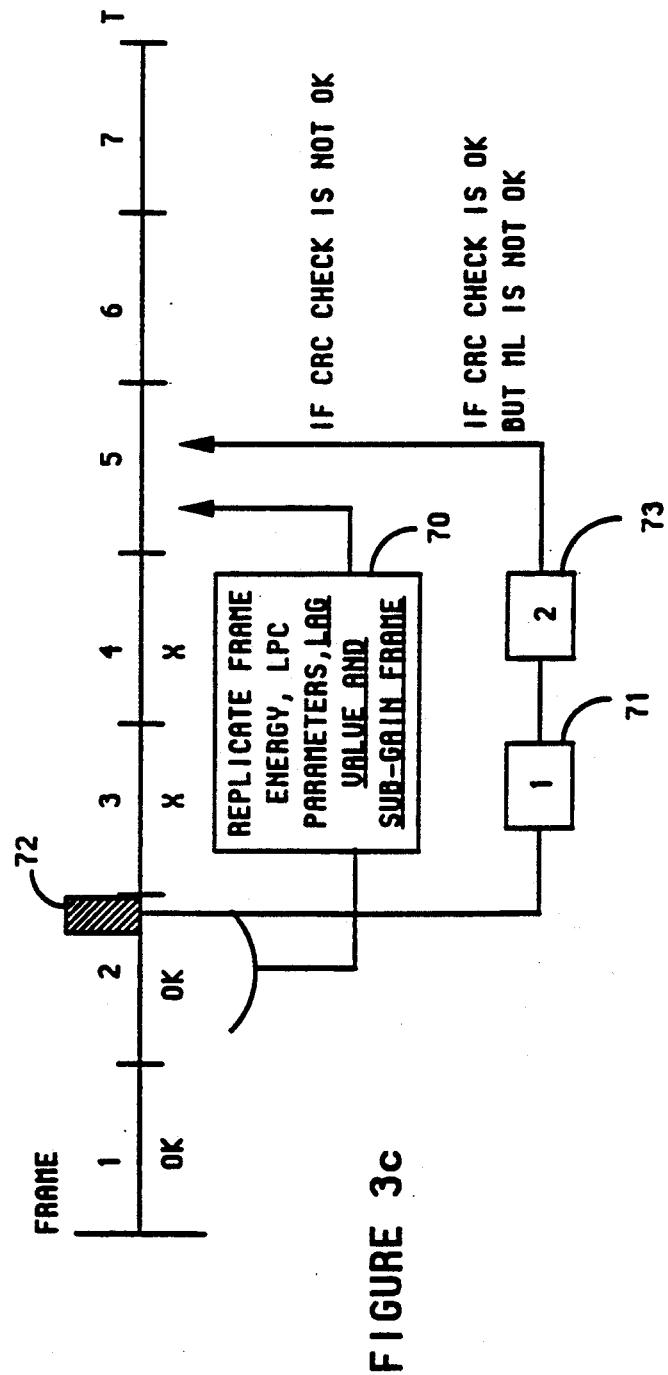
FIG. 3c is an illustration of the replication process according to said first and second embodiment of the invention.
Figure 3A:
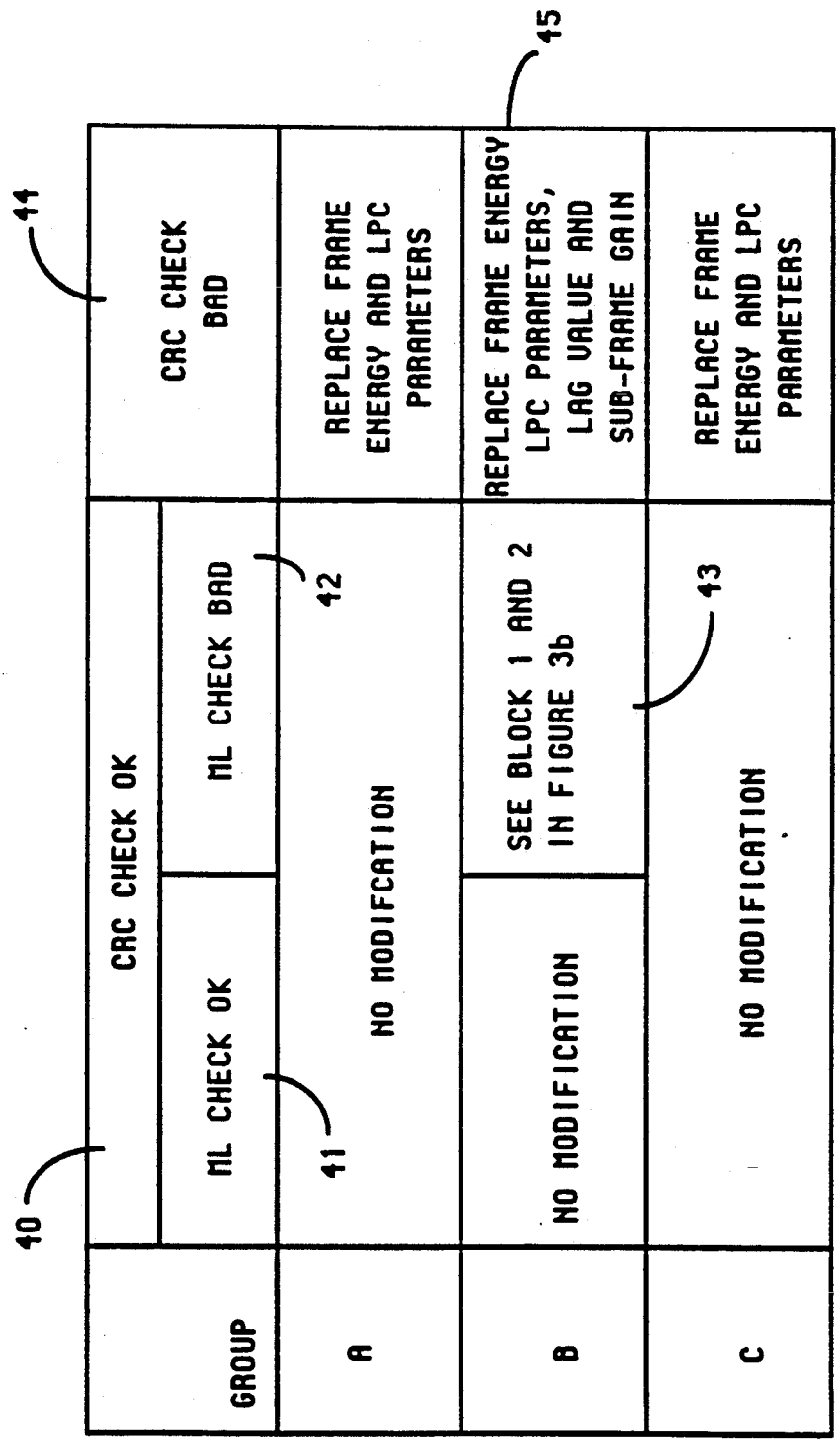
FIG. 3a is a table showing the decoding operation required for each group of bit, according to the invention.
Figure 3B:
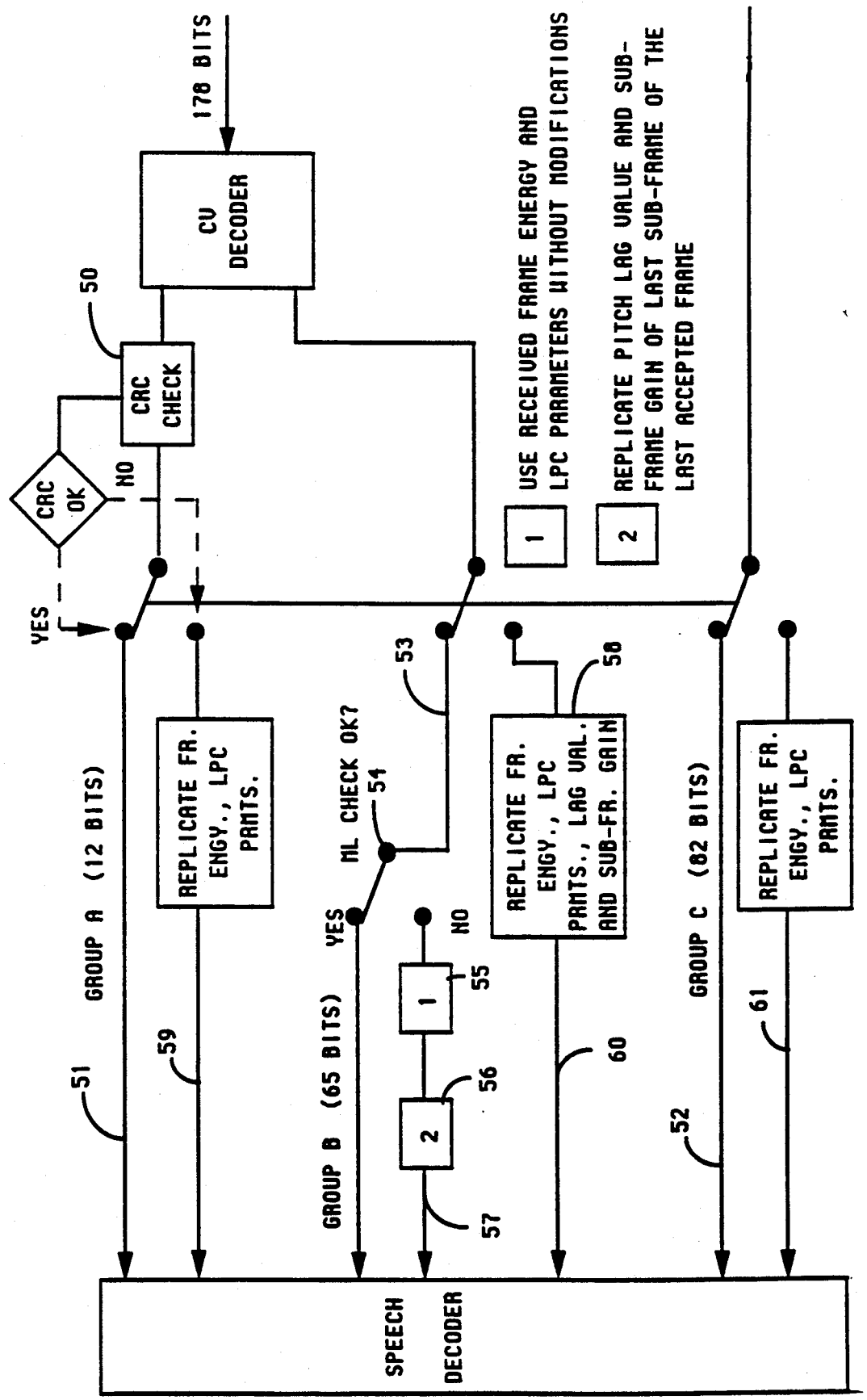
FIG. 3b is a block diagram used for illustrating the operation of the improved speech decoder according to a first embodiment of the present invention.

With reference to FIGS. 3b and 3c, we can see that in operation, the first error detection technique, i.e. the CRC check 50, is still completed as required by the standard. The 12 Group A bits 51 and the 82 Group C bits 52 are used at the speech coder without modification. However, the BER of the 65 Group B bits 53 is verified against the ML threshold. If the ML check is OK, indicating a minimal number of errors, the 65 Group B bits 53 are accepted without modification.

When a Viterbi algorithm is used with a hard channel information (hard decision), as in the IS-54 standard, the likelihood metric used is usually the hamming distance. In this case, the ML path is associated with the smallest Hamming distance. Thus, the smaller the Hamming distance, the lower is the BER for the decoded Group B bits. When this distance is higher then 19, the bits 53 are rejected. When the ML check 54 is not OK, the frame energy and LPC parameters of the frame are kept 55 without modifications. However, the pitch lag value and sub-frame gain of the last sub-frame of the last accepted frame are replicated 56. The modified Group B bits 57 is then sent to the speech decoder for further processing.

When the CRC check 50 is not OK, then as indicated above, the frame energy and LPC parameter bits of Groups A, B and C are replicated as per the standard. However, with respect to Group B, the replication process 58 includes the lag value and sub-frame gain of the last frame to have been correctly received. The modified Group A, B and C bits depicted, respectively, at reference numerals 59, 60 and 61 are then sent to the speech coder.

The example illustrated in FIG. 3c, shows the two bad frame masking technique when either of the error detection steps fail. In the first instance, if the CRC check of the Group A bits for Frame 5 was not OK, the frame energy and LPC parameters of the last frame considered to be correctly received, i.e. Frame 2, are replicated 70 for use in Frame 5. In addition, the lag value and sub-gain frame of frame 2 is also replicated. This replication is made for the Group A, B and C bits.

In the second instance, if the CRC check of the Group A bits is successful but the ML check fails, then, the Group A and C bits of frame 5 are sent to the speech decoder without modification (see FIG. 3b) and the received frame energy and LPC parameters of the Group B bits of frame 5 are used without modification 71. ON the other hand, the pitch lag value and sub-frame gain of the last sub-frame 72 of frame 2 are replicated 73. Thus, the modified Group B bits 57 (see FIG. 3b) comprises received frame energy and LPC parameters bits and replicated pitch lag value and sub-frame gain bits.

What is claimed is:

1. A method of improving the detection and masking of bad frames in a coded speech signal resulting from channel transmission errors, said coded speech signal having a first group of bits comprising the most significant bits of said coded speech signal, error detection bits and error correction bits, a second group of bits comprising the second most significant bits and error correction bits and a third group of bits comprising the least significant bits, said method comprising the steps of:

de-interleaving said coded signal to obtain a first series of bits comprising said first and second group of bits and a second series of bits comprising said third group of bits;

convolutionally decoding said first series of bits for recovering said first and second group of bits;

performing a Cyclic Redundancy Code (CRC) check on recovered bits of said first group;

if said CRC check is successful, utilizing said third group of bits and said recovered bits of said first group for speech decoding and performing a maximum likelihood check on said second group of bits;

if said maximum likelihood check is successful, utilizing said recovered bits of said second group for speech decoding; and if said maximum likelihood check is unsuccessful, replicating the pitch lag value and sub-frame gain for each sub-frame of said bad frame, from the last sub-frame of the previously accepted frame.

2. A method as defined in claim 1, further comprising the steps of:

if said CRC check is not successful, replicating the frame energy and LPC parameters for said first and third group of bits;

replicating the frame energy, LPC parameters, lag value and sub-frame gain for said second group of bits; and utilizing the replicated bits of said first, second and third groups for speech decoding.

3. A method as defined in claim 1, wherein said convolutional decoding comprises a Viterbi maximum likelihood convolution decoding.

4. A method as defined in claim 3, wherein said maximum likelihood check is successful if a metric assigned to the final surviving path by said Viterbi decoding is less than a predetermined threshold.

5. A method as defined in claim 4, wherein said metric is defined as the Hamming distance.

* * * * *